Dec. 26, 1967  R. P. DUNN  3,359,886
POPCORN POPPER

Original Filed Oct. 23, 1965  2 Sheets-Sheet 1

INVENTOR.
RICHARD P. DUNN
BY
Whittemore Hulbert
& Belknap
ATTORNEYS

INVENTOR.
RICHARD P. DUNN
BY
Whittemore Hulbert
& Belknap ATTORNEYS

United States Patent Office 3,359,886
Patented Dec. 26, 1967

3,359,886
POPCORN POPPER
Richard P. Dunn, Mount Clemens, Mich., assignor to Dun-Hot, Inc.
Continuation of application Ser. No. 503,380, Oct. 23, 1965. This application May 11, 1967, Ser. No. 637,847
23 Claims. (Cl. 99—238.3)

The present application is a continuation of my copending application Ser. No. 503,380, filed Oct. 23, 1965, now abandoned.

This invention relates to a machine or apparatus for cooking a pre-packaged cookable food product. The machine or apparatus is particularly adapted to be utilized in bars, restaurants and various places of entertainment where pre-packaged food products such as popcorn are utilized.

The practice of packaging foods in metal containers in which they may be heated to prepare them for serving is widespread. These containers are commonly formed of aluminum foil and some provision is made to protect the food contents from contamination between the time the same are packaged and the time of ultimate use by the consumer. Such protection is usually provided by utilizing a protective cover which closes and seals the container. As an example, the machine of the present invention is primarily adapted for use with a pre-packaged pre-sealed container or receptacle containing popcorn kernels, popping oil or fat and other ingredients. The receptacle contains a resilient or expandable cover which expands when the package is heated and the popcorn kernels expand. The expandable cover is so formed whereby gases produced by the melting of the fat in which the popcorn is carried will cause the expanding of the cover whereby sufficient space is provided for the popcorn kernels at all times during the popping operation. Various types of prepared pre-packaged containers are illustrated in the B. N. Robbins et al. U.S. Patent 2,815,883 and the F. C. Mennen U.S. Patent 3,054,680.

The machine of the present invention includes various parts and electrical components arranged in a compact housing, with the electrical components arranged in an electrical circuit which permits various automatically responsive and sequential functions. The machine of the present invention utilizes means for automatically controlling the heating and cooling cycles of the heating element and means for reciprocating the support fixture, which carries the pre-packaged container, relative to the heating element when energized so as to prevent burning of the food product.

An important feature of the machine is that the heating element is energized and the support fixture is reciprocated simultaneously. Another important feature of the machine is that the heating coil is de-energized and the support fixture is stopped once the food product is cooked. Thereafter a fan is automatically turned on so as to cool the housing and the heating element or coil.

It is an object of the present invention to provide a machine for cooking a food product located within a container having an expandable cover comprising a housing, a heating element carried by the housing, an annular support fixture mounted above the heating element for supporting a receptacle above the heating element, and means for simultaneously energizing the heating element, and reciprocating the support fixture so as to move the receptacle with respect to the heating coil.

Another object of the present invention is to provide a machine of the aforementioned type wherein a fan is provided in the housing which is energizable immediately upon de-energization of the heating element so as to cool the housing and the heating element.

Still another object of the present invention is to provide a machine of the aforementioned type wherein a piercing element is located directly above the expandable cover provided on the container, with the piercing element being effective to puncture the cover upon expansion thereof to permit the heated vapors or gases to escape from the container.

It is thus another object of this invention to provide a simplified low cost machine of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

Figure 1:
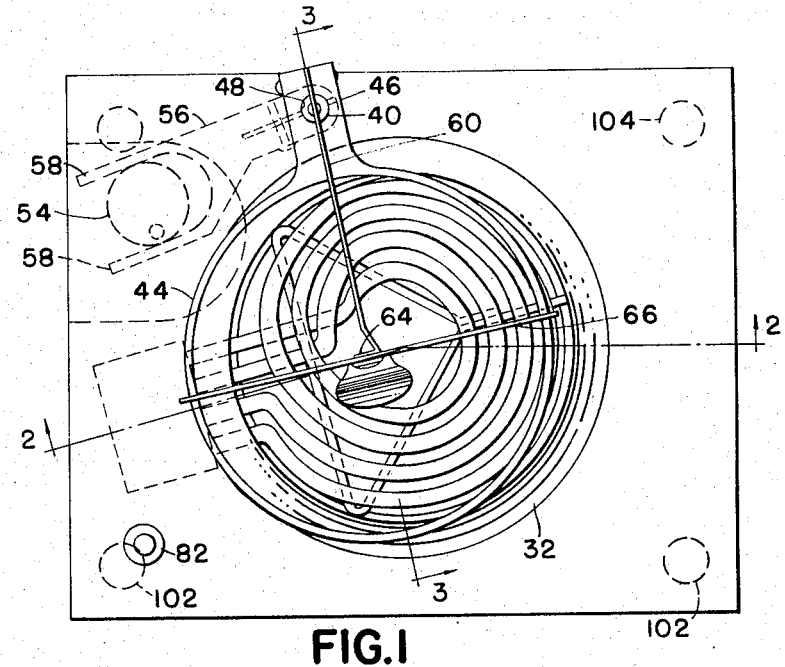
FIGURE 1 is a plan view of the machine or apparatus or the present invention.

Referring now to the drawings, the machine or apparatus is designated by the numeral 10 and includes a substantially closed housing 12 of generally rectangular configuration. The housing 12 is provided with a bottom wall 14, a pair of upstanding side walls 16, a pair of upstanding end walls 18 and a removable cover 20. The side walls 16 and end walls 18 are each provided with an inwardly turned flange 22. The cover 20 is provided with downwardly extending flanges 24 about the outer periphery thereof. The flanges 22 provide some support for the cover 20, while the cover flanges 24 help to provide a seal about the periphery of the housing 12 at the top thereof.

Figure 2:
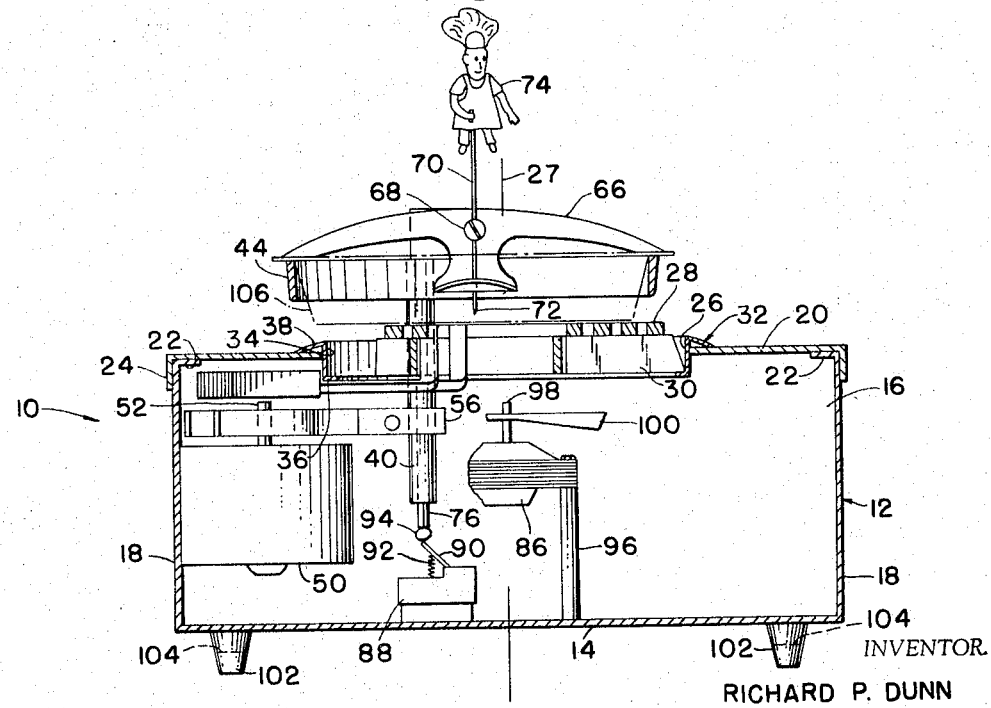
FIGURE 2 is a vertical sectional view of the machine taken on line 2—2 of FIGURE 1.

The cover 20 includes a generally circular opening 26 concentric with respect to the vertical axis 27 of the housing 12. A heating element or burner 28 in the form of a coil is supported in or adjacent to the opening 26. The burner or coil 28 is supported on an esutcheon 30 which in turn is supported in the opening 26 by means of an annular retainer or ring 32 as best illustrated in FIGURE 2. The retainer 32 includes a vertically extending annular wall 34 having at the lower end an inwardly turned flange 36 and at the upper end an outwardly turned downwardly extending lip 38 which engages the upper surface of the cover 20 surrounding the opening 26. The flange 36 supports the escutcheon 30 and thereby holds the escutcheon 30 and the heating element 28 in a fixed position with respect to opening 26.

A tubular shaft 40 is vertically mounted in the housing 12 at one side of the opening 26 as best illustrated in FIGURES 1 and 2. The shaft 40 includes an outer portion which extends upwardly beyond the cover 20 and a lower portion located within the interior of the housing 12. The shaft 40 is mounted in the housing 12 for rotary reciprocating movements as will be subsequently explained.

An annular support ring or fixture 44 is mounted directly above the heating element 28 and is provided with an outwardly extending lug 46 having an opening 48 therein which receives the upper end portion of the shaft 40. The lug 46 of the support fixture 44 is fixedly connected to the shaft 40 so that when the shaft 40 is reciprocably rotated, corresponding reciprocating movement is in turn transmitted to the support fixture 44 as will be subsequently described.

Located within the interior of the housing 12 is a drive motor 50 having a rotary shaft 52 to which is connected a rotary cam 54. A generally U-shaped crank 56 is fixedly connected to the lower portion of the shaft 40. The crank 56 includes a pair of spaced arms 58 which engage opposite portions of the cam 54 as best illustrated in FIGURE 1. The motor 50 when energized rotates shaft 52 and cam 54 which results in the movement of crank 56 which in turn is effective to reciprocably rotate shaft 40. The movement of shaft 40 is translated into reciprocating movement of the fixture 44.

Figure 3:
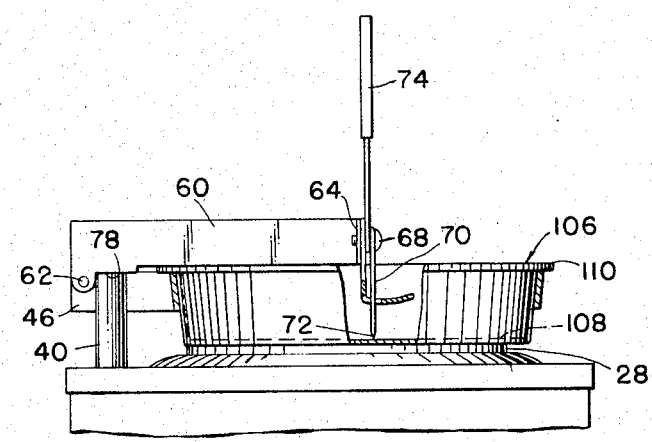
FIGURE 3 is a fragmentary view of the machine, partly in section, taken on the line 3—3 of FIGURE 1 and illustrating the piercing element of the machine in a generally vertical non-operative position.
Figure 4:
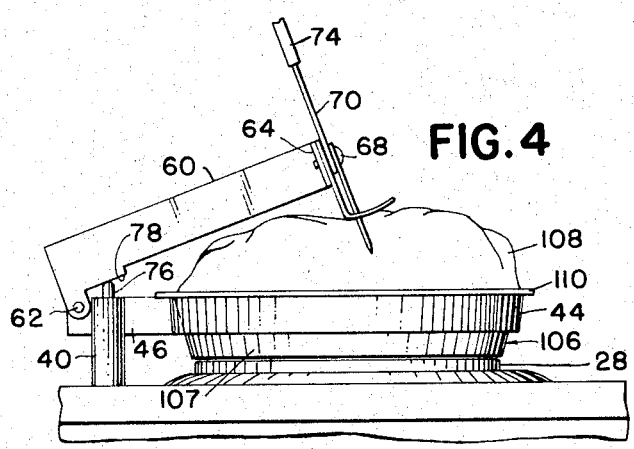
FIGURE 4 is a view similar to FIGURE 3 and illustrating the piercing element in a raised or tilted position due to the expansion of the cover and the cookable food product contained in the container.

A senser arm or lever 60 is pivotally connected on the outer end thereof to the lug 46 of the support fixture 44 by means of a pivot pin 62 as best illustrated in FIGURES 3 and 4. The senser arm 60 extends from pivot pin 62 inwardly towards the axis 27 of the opening 26. The inner end of the senser arm 60 is provided with a mounting flange 64. A generally diametrically extending lever or senser element 66 arranged perpendicular to the arm 60 is connected to the flange 64 of the senser arm 60 by means of a screw or other suitable fastening device 68. Mounted on the same fastening device 68 is a piercing element or perforator 70 having a pointed lower end 72 and on the upper end a suitable decorative figure or symbol 74. The lever 60 and senser element 66 form a T-shaped carrier for the piercing element 70. The lever 60, element 66 and perforator 70 form an integral unit which is pivotally mounted about pivot pin 62. The senser lever 60 and the senser element 66 form a sensing unit or sensing means which is used for a purpose to be hereinafter described.

Located within the interior of shaft 40 is an actuator rod 76 which has a length greater than the length of shaft 40. The lever 60 includes an abutment or stop surface 78 which spans the top of the tubular shaft 40 to hold the rod 76 in its lowest position as illustrated in FIGURE 3.

The heating coil 28 and drive motor 50 are arranged in an electrical circuit 80 (FIGURE 5) along with other electrical components including a manually operated push make-break switch 82, relay 84, fan motor 86 and a micro switch 88. The relay 84, as an example, is in the form of a double pole double throw 115 volts, 60 cycle switch. The circuit 80 includes a plug 81 which may be connected to an electrical power source, not shown.

Figure 5:
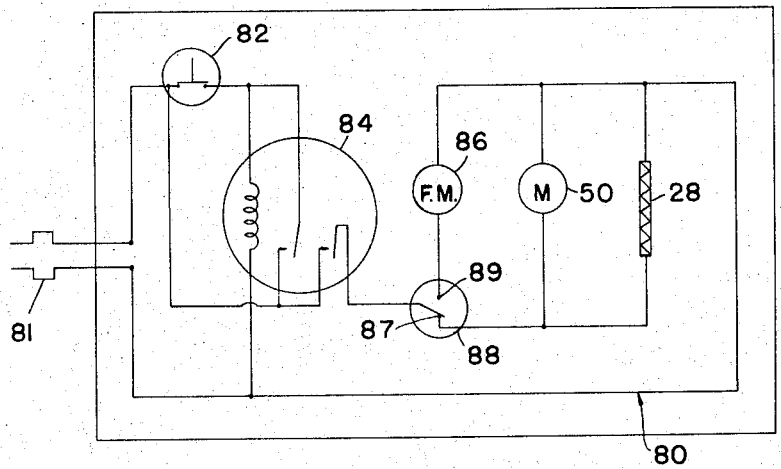
FIGURE 5 is a circuit diagram illustrating the manner in which the electrical components of the machine are connected.

The micro switch 88 is mounted on the bottom wall 14 and includes a pair of contact points 87 and 89 and switch arm 90 which is biased by spring 92 in an upwardly direction to urge arm 90 towards the contact point 89. The arm 90 is provided with a roller 94 on the outer end thereof which engages the bottom of the actuator rod 76. The spring 92 is compressed when the lever 60 is in its normal non-operative position shown in FIGURE 3 due to the fact that the abutment 78 provided on lever 60 engages the top of rod 76 and through it exerts a compressive force on spring 92 to hold switch arm 90 against the contact point 87 as shown in FIGURE 5. With the rod 76 in its lowered position as shown in FIGURES 2 and 3, the closing of switch 82 completes the circuit through relay 84, micro switch 88 and the motor 50 and heating element 28 which are arranged in parallel.

A vertically extending column 96 is mounted in housing 12 and is secured on the lower end to the bottom wall 14. The fan motor 86 is connected to the top portion of column 96. The motor 86 is provided with a rotary shaft 98 to which is connected an impeller or fan 100 having, as an example, a plurality of blades. The fan 100 is located directly below the heating element 28 for dispersing heat from the housing 12 and heating element 28 after the heating element 28 is de-energized. The heating element 28 and motor 50 are de-energized simultaneously once the abutment 78 provided on arm 60 is moved upwardly as shown in FIGURE 4. At such time the spring 92 is effective to urge the contact arm 90 against contact point 89 and move rod 76 upwardly. When the contact arm 90 engages contact point 89 the motor 50 and heating element 28 are de-energized and the current in the circuit is directed through the fan motor 86 to energize and rotate fan 100 which removes the heat from the housing 12 and heating element 28. As long as the lever or arm 60 is raised as shown in FIGURE 4, the fan motor 86 remains energized.

The housing 12 is provided with a pair of front legs 102 and a pair of back legs 104 which are shorter than the front legs 102.

The machine 10 is primarily designed as a popcorn popper. The package or receptacle 106 includes a relatively shallow, pan-type aluminum foil utensil 107 having a readily flexible or expandable cover 108. Confined between the pan 107 and cover 108 is a charge of product to be cooked. As an example, the charge may include popcorn kernels, popping oil, and other ingredients. The cover 108 and the rim 110 of pan 107 provide a seal to keep moisture and foreign matter out of the package 106.

The package or receptacle 106 is placed in the annular support 44 with the rim 110 thereof in engagement with the top of the support 44 to hold the package or receptacle 106 above and spaced slightly from the top of the heating coil 28. Thereafter the lever 60 and piercing element 70 are moved to the position shown in FIGURE 3, with the pointed end 72 slightly above the top of cover 108.

Thereafter the switch 82 is closed to complete the electrical circuit whereby the motor 50 and heating element 28 are energized. The motor 50 rotates the cam 54 so as to move and reciprocate the crank arm 56. The motion of the crank arm 56 in turn is translated into rotary reciprocating movement of shaft 40 which is effective to move or jiggle the annular support in a reciprocating motion relative to the heating coil 28.

Since the receptacle 106 is carried by support 44 it is also moved relative to the coil 28 so as to prevent the kernels from burning. As the popcorn pops and the fats or oils melt vapors or gases are created within the package 106 so that the cover 108 expands. The horizontal swinging or pendulum action of the piercing pin 70 caused by the jiggler arm 60 tears a hole in the expanding cover 108 allowing the gases to escape. This prevents premature cut-off of the microswitch 88 which would result if no hole was placed in cover 108. Thereafter the popcorn continues to pop and thereby further expands the cover 108. As a result of this expansion the cover 108 and popcorn exert a force on piercing element 70 and on the sensing means including the element 66 and the lever 60 so as to rotate same about pivot 62. As a result thereof the senser lever 60 and element 66 are moved to the raised position shown in FIGURE 4 which is achieved when the popcorn kernels in package 106 are generally completely popped or cooked. Thereafter the heating coil 28 and motor 50 are de-energized simultaneously as explained previously and the fan motor 86 is energized and remains energized as long as the lever 60 is raised. Thus it will be noted that the sensing means or unit (lever 60 and element 66) is responsive to a change in the contents of the package or receptacle 106 to de-energize the coil 28 and motor 50.

Once the popcorn is popped, the package 106 is removed from the annular support 44. The cover 108 is opened to permit a person to eat the popcorn in the usual manner. After the receptacle 106 has been removed from the annular support 44 the lever 60 is lowered to the position illustrated in FIGURE 3. Thereafter the fan motor 86 is deenergized. It should be appreciated that the lever 60 and piercing element 70 are kept in the raised position of FIGURE 4 until the housing 12 and heating element 28 are cooled.

The back legs 104 of the housing 12 as mentioned previously are shorter than the front legs 102. The reason for this is to permit the grease and other oil in the container or receptacle 106 to flow to the back of the package or receptacle once the oil has been thrown forward due to the centrifugal force generated during the shaking of the receptacle 106.

The senser element 66 is effective to hold the rim of the receptacle 106 against the top surface of the annular support 44.

In order to operate the popcorn machine 10, the lever 60, senser element 66 and piercing element 70 are raised to permit the rim of the receptacle to be placed on the top surface of the annular support 44. Thereafter the lever 60, and associated elements are lowered with the piercing element 70 in close proximity to the center of the cover 108. At the time the package or receptacle 106 is placed in the support fixture 44 the microswitch 88 assumes the position illustrated in FIGURE 5. Thereafter the switch 82 is pushed so as to close the relay 84 and thereafter energize the heating element or coil 28 and the drive or jiggle motor 50. Once the cover 108 starts to expand it is punctured by the piercing element 70 to permit the gases to escape from the receptacle or package. As the lever 60 and associated elements move upwardly upon expansion of the cover 108 the spring 92 of the microswitch 88 moves the rod 76 upwardly until finally the switch arm 90 engages the contact point 89. At such time the motor 50 and heating element 28 are de-energized and the electrical current is then directed through the fan motor 86 to energize and rotate the fan 100.

The drawings and the foregoing specification constitute a description of the improved popcorn popper in such full, clear, concise and exact terms as to enable any person skilled in the art to practice the invention, the scope of which is indicated by the appended claims.

What I claim as my invention is:

1. A machine for cooking comprising a housing, a heating element carried by said housing, a pivotally reciprocable movable support fixture mounted on said housing above said heating element for supporting a receptacle above said heating element, said support fixture having a vertical pivot axis, and means for energizing said heating element and for reciprocating said support fixture in a generally horizontal plane about said pivot axis to move the receptacle with respect to said heating element.

2. The machine defined in claim 1 wherein sensing means is carried by said housing and engageable with the receptacle, said sensing means being responsive to a change in the contents of the receptacle to de-energize said first-mentioned means.

3. The machine defined in claim 2 wherein said sensing means includes a sensing element which is operatively connected to said support fixture, said element spanning said fixture and being engageable with the top of the receptacle.

4. The machine defined in claim 3 wherein a movable piercing element is operatively connected to said sensing element, said piercing element being adapted to puncture an expandable cover on the receptacle upon expansion thereof.

5. The machine defined in claim 1 wherein a lever is pivotally connected on one end to said support fixture, and a sensing element is connected to the other end of said lever and spans said support fixture, said sensing element being engageable with the receptacle.

6. The machine defined in claim 5 wherein a piercing element is carried by said sensing element for puncturing an expandable cover on the receptacle to permit gaseous vapors to escape from the receptacle.

7. The machine defined in claim 5 wherein a tubular shaft is mounted in said housing, an actuating rod in said shaft, a normally opened switch including biasing means for urging said rod upwardly, said lever extending across said shaft and engageable with said rod to hold said rod in a lowered position, corresponding to the off position of said switch, the expansion of the cover on said receptacle being effective to swing said lever and sensing element upwardly to permit said biasing means to urge said rod upwardly to permit closing of said switch which causes the de-energization of said heating element.

8. The machine defined in claim 7 wherein a fan is located in said housing, said fan being energizable upon the de-energization of said heating element to remove the heat from said housing.

9. A machine for cooking comprising a housing, a heating element carried by said housing, a support fixture mounted above said heating element for supporting a receptacle above said heating element, means for energizing said heating element and for reciprocating said support fixture to move the receptacle with respect to said heating element, and fan means in said housing which is energizable upon de-energization of said first-mentioned means.

10. The machine defined in claim 9 wherein sensing means is carried by said housing and engageable with the receptacle, said sensing means being responsive to a change in the contents of the receptacle to de-energize said first-mentioned means and to energize said fan means.

11. A machine for cooking comprising a housing having an upper surface provided with an opening therein, a heating element carried by said housing adjacent said opening, a generally vertically extending shaft mounted in said housing at one side of said opening for rotary reciprocating motion, said shaft having upper and lower portions, with said upper portion located above the upper surface of said housing, a support fixture for supporting a receptacle connected to the upper portion of said shaft and located above said heating element, a drive motor in said housing, actuating means operatively connecting said drive motor to the lower portion of said shaft for reciprocating same and thereby reciprocate said annular support and the receptacle with respect to said heating element, and means for energizing said heating element and said drive motor.

12. The machine defined in claim 11 wherein a lever is pivotally connected on one end to said support fixture, said lever extending toward the opposite portion of said fixture, and a senser arm connected to the other end of said lever and spanning said support fixture, said arm being engageable with a container carried by the support fixture.

13. The machine defined in claim 12 wherein said shaft is tubular, an actuating rod in said shaft, a normally opened switch including resilient means for biasing said rod upwardly, said lever extending across said shaft and engageable with said rod to hold said rod in a lowered position, corresponding to the off position of said switch, the expansion of the cover on the container being effective to swing said lever and arm upwardly to permit said resilient means to urge said rod upwardly to permit closing of said switch which causes the de-energization of said heating element and said drive motor.

14. The machine defined in claim 11 wherein a fan is located in said housing, said fan being energizable upon the de-energization of said heating element and said drive motor to remove the heat from said housing.

15. A machine for cooking comprising a housing, a heating element carried by said housing, a support fixture mounted above said heating element for supporting a container containing a cookable material above said heating element, the container having an outer cover adapted to expand upon the accumulation of heated vapors in the container, a piercing element located above the cover on the container, and means for energizing said heating element to cook the material in the container, said piercing element being effective to puncture the cover on the container upon expansion thereof to permit the heated vapors to escape from the container.

16. The machine defined in claim 15 wherein means is provided for raising said piercing element after the cover is punctured, said last-mentioned means being responsive to further expansion of the cover.

17. A machine for cooking comprising a housing, a heating element carried by said housing, a support fixture mounted above said heating element for supporting a container containing a cookable material above said heating element, the container having an outer cover adapted to expand upon the accumulation of heated vapors in the container, a piercing element operatively connected to said support fixture and located above the cover on the container, means for energizing said heating element to cook the material in the container, said piercing element being effective to puncture the cover on the container upon expansion thereof to permit the heated vapors to escape from the container, and second means for reciprocating said support fixture to move the container with respect to said heating coil.

18. The machine defined in claim 17 wherein means is provided for raising said piercing element after the cover is punctured, said last-mentioned means being responsive to further expansion of the cover.

19. A machine for cooking comprising a housing, a heating element carried by said housing, a support fixture mounted above said heating element for supporting a container containing a cookable expandable material above said heating element, the container having an outer cover adapted to expand upon the accumulation of heated vapors in the container, a piercing element operatively connected to said support fixture and located in predetermined spaced relationship with respect to the cover on the container, first means for energizing said heating element to cook the material in the container and expand same, said piercing element being effective to puncture the cover on the container upon expansion thereof to permit the vapors to escape from the container, and second means for reciprocating said support fixture to move the container with respect to said heating element, and fan means in said housing and cooling said heating element and which is energizable upon de-energization of said first and second means.

20. A machine for cooking comprising a housing, a heating element carried by said housing, a support fixture mounted above said heating element for supporting a container containing a heatable expandable material above said heating element, the container having an outer cover adapted to expand upon the accumulation of heated vapors and upon the expansion of the material in the container, a senser arm spanning said fixture engageable with the container, a piercing element operatively connected to said senser arm and located above the cover on the container, means for energizing said heating element to cook the material in the container, said piercing element being effective to puncture the cover on the container upon expansion thereof to permit the vapors to escape from the container, said senser arm and piercing element being movable away from the support fixture upon further expansion of the cover.

21. A cooking machine comprising a housing having an upper surface provided with an opening therein, a heating element mounted adjacent said opening, a tubular shaft carried by said housing, a support fixture mounted above said heating element and carried by said tubular shaft, said support fixture adapted to carry a container having an expandable cover, an actuator rod in said tubular shaft, drive means for oscillating said shaft to provide reciprocating movement of said support fixture, a lever pivotally connected to said support fixture and engageable with the top of said shaft, a senser arm carried by the other end of said lever and engageable with the container, said lever and senser arm being movable upwardly away from the top of said shaft upon expansion of the cover, and means engageable with the bottom of said actuator rod for moving same upwardly once said lever is moved away from said shaft to de-energize said heating element and drive means.

22. The machine defined in claim 21 wherein a fan is located in said housing for cooling same, said fan being energizable upon de-energization of said heating element and drive means.

23. The machine defined in claim 21 wherein a piercing element is connected to said senser arm and movable therewith, said piercing element being adapted to puncture the cover in the container upon expansion thereof.

References Cited

UNITED STATES PATENTS

| | | | |
|---|---|---|---|
| 1,583,357 | 5/1926 | Lewis | 219—433 |
| 2,012,981 | 9/1935 | Wilsey | 219—433 |
| 2,158,460 | 5/1939 | Knapp | 99—238.6 |
| 2,193,392 | 3/1940 | Coltman | 99—238.2 |
| 2,590,580 | 3/1952 | Schiavone | 99—238.2 |
| 2,760,481 | 8/1956 | Sprung | 126—215 |
| 2,797,298 | 6/1957 | Fujitani | 219—528 |
| 2,905,452 | 9/1959 | Appleton | 259—105 |
| 3,028,476 | 4/1962 | Hug | 219—443 |
| 3,118,396 | 1/1964 | Brown et al. | 219—201 |

ROBERT W. JENKINS, *Primary Examiner.*